United States Patent
Laradji et al.

(10) Patent No.: US 12,373,980 B2
(45) Date of Patent: Jul. 29, 2025

(54) METHOD AND SYSTEM FOR LOCALIZATION WITH SUPERVISION

(71) Applicant: ServiceNow, Inc., Santa Clara, CA (US)

(72) Inventors: Issam Hadj Laradji, Montreal (CA); David Vazquez Bermudez, Montreal (CA); Pau Rodriguez Lopez, Montreal (CA); Rafael Pardinas, Montreal (CA)

(73) Assignee: ServiceNow, Inc., Santa Clara, CA (US)

(*) Notice: Subject to any disclaimer, the term of this patent is extended or adjusted under 35 U.S.C. 154(b) by 340 days.

(21) Appl. No.: 17/759,785

(22) PCT Filed: Jan. 29, 2021

(86) PCT No.: PCT/IB2021/050745
§ 371 (c)(1),
(2) Date: Jul. 29, 2022

(87) PCT Pub. No.: WO2021/152547
PCT Pub. Date: Aug. 5, 2021

(65) Prior Publication Data
US 2023/0082179 A1    Mar. 16, 2023

Related U.S. Application Data

(60) Provisional application No. 62/968,524, filed on Jan. 31, 2020.

(51) Int. Cl.
*G06T 7/70*    (2017.01)
*G06V 10/764*    (2022.01)
(Continued)

(52) U.S. Cl.
CPC .............. *G06T 7/70* (2017.01); *G06V 10/764* (2022.01); *G06V 10/774* (2022.01);
(Continued)

(58) Field of Classification Search
None
See application file for complete search history.

(56) References Cited

U.S. PATENT DOCUMENTS 10,818,017 B2 * 10/2020 Ardö ..................... G06T 7/74
2018/0285682 A1   10/2018 Najibi et al.
(Continued)

FOREIGN PATENT DOCUMENTS

CN    109741347 A    5/2019

OTHER PUBLICATIONS

Cheng, K-W. et al., "Improved Object Detection With Iterative Localization Refinement in Convolutional Neural Networks", IEEE Transactions on Circuits and Systems for Video Technology, vol. 28, No. 9, pp. 2261-2275, Sep. 2018, retrieved from htt11s://ieeex11lore.ieee.org/abstract/document/7987752 on Apr. 25, 2021 (Apr. 25, 2021) *whole document, in particular: Abstract, Introduction, pp. 2263, 2269*.

(Continued)

*Primary Examiner* — Thomas D Lee
(74) *Attorney, Agent, or Firm* — FLETCHER YODER PC (57) ABSTRACT

A method for training a machine learning localization model to localize objects belonging to a given class within an image, the method comprising: receiving images each comprising objects of the given class; and for each image: receiving a heat map generated using the machine learning localization model; identifying proposals each corresponding to a potential object, each proposal having associated thereto an initial probability that the proposal corresponds to the potential object; for each proposal, correcting the initial probability using the heat map; selecting given ones of the proposals having a greatest corrected probability, thereby identifying object candidates; and calculating a loss for the machine learning localization model based on a location of (Continued)

the object candidates within the training image and the heat map; and providing the calculated loss to the machine learning localization model.

20 Claims, 6 Drawing Sheets

(51) Int. Cl.
*G06V 10/774* (2022.01)
*G06V 10/776* (2022.01)
*G06V 10/82* (2022.01)

(52) U.S. Cl.
CPC ............ *G06V 10/776* (2022.01); *G06V 10/82* (2022.01); *G06T 2207/20076* (2013.01); *G06T 2207/20081* (2013.01); *G06T 2207/20084* (2013.01)

(56) References Cited

U.S. PATENT DOCUMENTS

| 2018/0365532 | A1 | 12/2018 | Molchanov et al. | |
|---|---|---|---|---|
| 2019/0279074 | A1 | 9/2019 | Lin et al. | |
| 2020/0050893 | A1* | 2/2020 | Suresh | G06T 11/40 |
| 2021/0192727 | A1* | 6/2021 | Ward | G06T 11/20 |

OTHER PUBLICATIONS

Gidaris, S. et al., "Object detection via a multi-region & semantic segmentation-aware CNN model", arXiv.org, v3, pp. 1-17, Sep. 23, 2015 (Sep. 23, 2015), retrieved from htt11s://arxiv.org/abs/1505.0I 749 on Apr. 25, 2021 (Apr. 25, 2021) *whole document, in particular: Abstract, Introduction, pp. 6-8 *.

Erhan, D. et al., "Scalable Object Detection using Deep Neural Networks", arXiv.org, vl, pp. 1-8, Dec. 8, 2013 (Aug. 12, 2013), retrieved from https://arxiv.org/abs/1312.2249 on Apr. 25, 2021 (Apr. 25, 2021) *whole document*.

Gong, J. et al., "Improving Multi-stage Object Detection via Iterative Proposal Refinement", Westwell Lab Research Group Shanghai, China, pp. 1-13, 2019, retrieved from https://bmvc2019.org/wp-content/uploads/papers/0545-paper.pdf on Apr. 25, 2021 (Apr. 25, 2021) *whole document*.

Ren, S. et al., "Faster R-CNN: Towards Real-Time Object Detection with Region Proposal Networks", arXiv.org, v3, pp. 1-14, Jan. 6, 2016 (Jun. 1, 2016), retrieved from https://arxiv.org/abs/1506.01497 on Apr. 25, 2021 (Apr. 25, 2021) *whole document*.

International Search Report and Written Opinion of International Application No. PCT/IB2021/050745.

* cited by examiner

METHOD AND SYSTEM FOR LOCALIZATION WITH SUPERVISION

TECHNICAL FIELD

The present invention relates to the field of methods and systems for counting and localizing objects within an image, and more particularly to methods and systems for training a machine learning localization system.

BACKGROUND

Object counting is an important task in computer vision with many applications such as in surveillance systems, traffic monitoring, ecological surveys, and cell counting. In traffic monitoring, counting methods can be used to track the number of moving cars, pedestrians, and parked cars. They can also be used to monitor the count of different species such as penguins, which is important for animal conservation. Furthermore, object counting has been used for counting objects present in everyday scenes in challenging datasets where the objects of interest come from a large number of classes such as the Pascal VOC dataset.

Many challenges are associated with object counting. Models need to learn the variability of the objects in terms of shape, size, pose, and appearance. Moreover, objects may appear at different angles and resolutions, and may be partially occluded. Also, the background, weather conditions, and illuminations can vary widely across the scenes. Therefore, the model used for object counting needs to be robust enough to recognize objects in the presence of these variations in order to perform efficient object counting.

Due to these challenges, regression-based models such as "glance" and object density estimators have consistently defined state-of-the-art results in object counting. This is because their loss functions are directly optimized for predicting the object count. In contrast, detection-based methods need to optimize for the more difficult task of estimating the location, shape, and size of the object instances. Indeed, perfect detection implies perfect count as the count is simply the number of detected objects. However, models that learn to detect objects often lead to worse results for object counting.

Therefore, there is a need for an improved method and system for training a machine learning localization model or system to localize objects within an image.

SUMMARY

According to a first broad aspect, there is provided a computer-implemented method for training a machine learning localization model to localize objects belonging to a given class within an image, the method comprising: receiving a plurality of training images each comprising at least one object of the given class; and for each one of the training of images: receiving a heat map of the training image generated using the machine learning localization model, each pixel of the heat map having associated thereto a given probability that the pixel belongs to one of the at least one object; identifying, within the training image, proposals each corresponding to a potential object, each proposal having associated thereto an initial probability that the proposal corresponds to the potential object; for each one of the proposals, correcting the initial probability using the heat map, thereby obtaining a corrected probability for each one of the proposals; selecting given ones of the proposals having a greatest corrected probability, thereby identifying object candidates; and calculating a loss for the machine learning localization model based on a location of the object candidates within the training image and the heat map; and providing the calculated loss to the machine learning localization model to update parameters of the machine learning localization model.

In one embodiment, a number of the object candidates is equal to a number of the at least one object of the given class contained in the training image.

In another embodiment, a number of the object candidates is less than a number of the at least one object of the given class contained in the training image.

In one embodiment, the method further comprises iteratively increasing the number of object candidates and for each iteration performing said receiving the heat map, said identifying the proposals, said correcting the initial probability, said selecting the given ones of the proposals, said calculating the loss and said providing the calculated loss.

In one embodiment, the step of correcting the initial probability is performed using a maximum probability of the given probability of given pixels of the heat map that corresponding to the proposal.

In one embodiment, the corrected probability is a maximum value between the initial probability and the maximum probability In one embodiment, the step of selecting the given ones of the proposals further comprises identifying a foreground region intersecting the given ones of the proposals and a background region intersecting none of the proposals, and the step of calculating the loss is performed further based on at least one of the foreground region and the background region.

In one embodiment, the machine learning localization model comprises a fully supervised localization model.

In one embodiment, the fully supervised localization model comprises one of a fully convolutional neural (FCN) network, a FCN with a ResNet backbone, a PSPNet, DeepLab and a Tiramisu.

In one embodiment, the step of identifying the proposals is performed by one of a region proposal network, a selective search model, a sharpmask and a deepmask.

According to another broad aspect, there is provided a system for training a machine learning localization system to localize objects belonging to a given class within an image, the system comprising: a region proposal unit for: receiving a plurality of training images each comprising at least one object of the given class; and for each one of the training images, identifying, within the training image, proposals each corresponding to a potential object, each proposal having associated thereto an initial probability that the proposal corresponds to the potential object; a rescoring unit for, for each one of the training images: receiving a heat map of the training image from the machine learning localization system, each pixel of the heat map having associated thereto a given probability that the pixel belongs to one of the at least one object; and correcting the initial probability using the heat map to obtain a corrected probability for each one of the proposals; an object classifier for, for each one of the training images, selecting given ones of the proposals having a greatest corrected probability to identify object candidates; and a loss calculator for, for each one of the training images: calculating a loss for the machine learning localization system based on a location of the object candidates within the training image and the heat map; and outputting the calculated loss to update parameters of the machine learning localization system.

In one embodiment, the number of the object candidates is equal to the number of the at least one object of the given class contained in the training image.

In another embodiment, the number of the object candidates is less than the number of the at least one object of the given class contained in the training image.

In one embodiment, the region proposal unit is configured for iteratively generate the proposals for each one of the plurality of training images, the rescoring unit is configured for correcting the initial probability at each iteration, the object classifier is configured for increasing the number of object candidates and selecting given ones of the proposals at each iteration, and the loss calculator is configured for calculating the loss at each iteration.

In one embodiment, the rescoring unit is configured for correcting the initial probability using a maximum probability of the given probability of given pixels of the heat map that corresponding to the proposal.

In one embodiment, the corrected probability is a maximum value between the initial probability and the maximum probability In one embodiment, the object classifier is further configured for identifying a foreground region intersecting the given ones of the proposals and a background region intersecting none of the proposals, and the loss calculator is configured for calculating the loss further based on at least one of the foreground region and the background region.

In one embodiment, the machine learning localization system comprises a fully supervised localization system.

In one embodiment, the fully supervised localization system comprises one of a fully convolutional neural (FCN) network, a FCN with a ResNet backbone, a PSPNet, DeepLab and a Tiramisu.

In one embodiment, the region proposal unit comprises one of a region proposal network, a selective search unit, a sharpmask and a deepmask.

In one embodiment, the loss calculator is integrated in the machine learning localization system.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description and the accompanying drawings.

BRIEF DESCRIPTION OF THE DRAWINGS

Further features and advantages of the present invention will become apparent from the following detailed description, taken in combination with the appended drawings, in which:

FIG. 5b illustrates an exemplary heat map corresponding to the image of FIG. 5a;

It will be noted that throughout the appended drawings, like features are identified by like reference numerals.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 1:
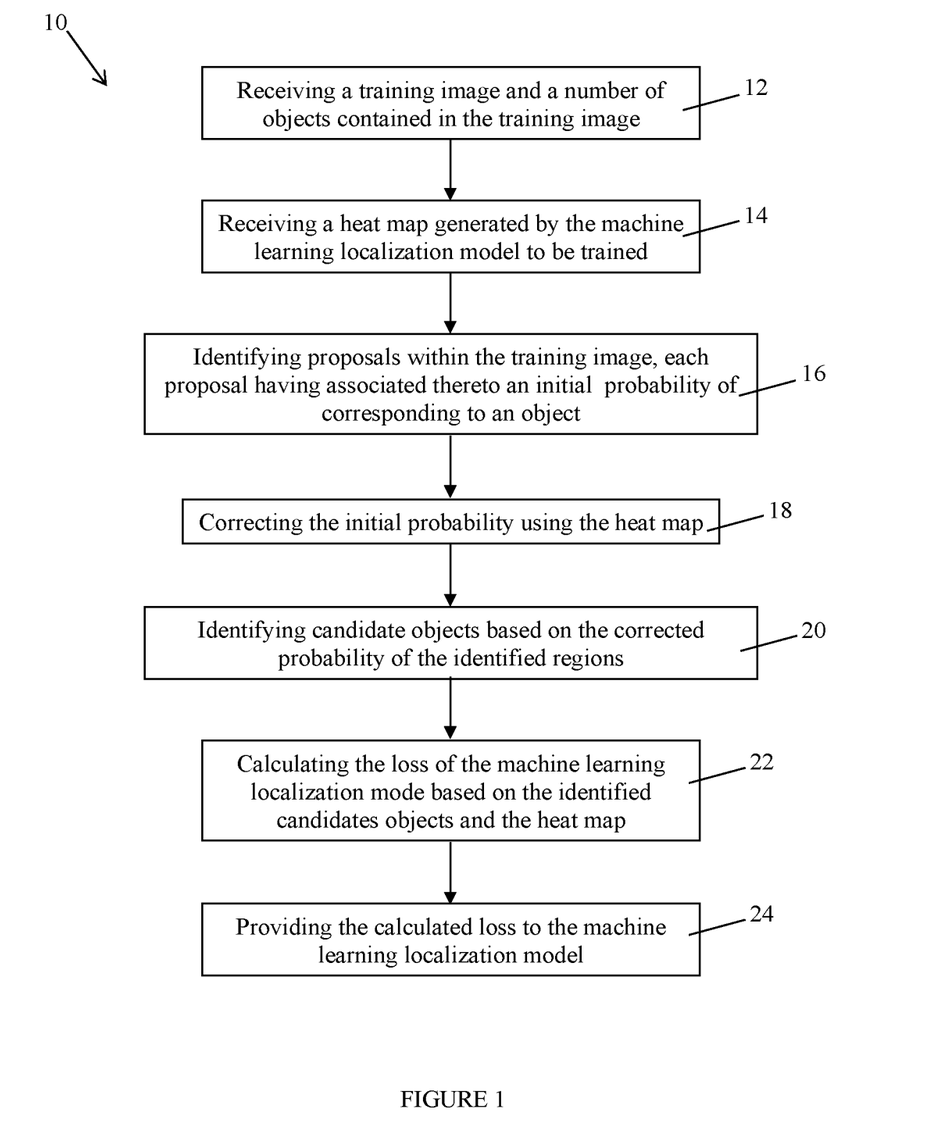
FIG. 1 is a flow chart illustrating a method for training a machine learning localization model to localize objects of interest within an image, in accordance with an embodiment.

FIG. 1 illustrates one embodiment of a computer-implemented method 10 for training a machine learning localization model adapted to localize within an image objects belonging to a given class or type of objects. It should be understood that an object may refer to an inanimate object or a living being such as a human being, an animal or the like.

For example, the machine learning localization model may be adapted to localize terrestrial vehicles such as cars, trucks and motorcycles within images. In another example, the machine learning localization model may be adapted to localize cars only.

In a further example, the machine learning localization model may be adapted to localize human beings within images. In still another example, the machine learning localization model may be adapted to localize animals or a particular race of animals such as cows, penguins, etc.

In one embodiment, the machine learning localization model to be trained is differentiable.

In one embodiment, the machine learning localization model to be trained is a fully supervised localization model. For example, the machine learning model may be a fully convolutional neural (FCN) network, a FCN with a ResNet backbone, a PSPNet, DeepLab, a Tiramisu or the like.

It should be understood that the machine learning localization model configured to localize a given class of object is adapted to generate and output a heat map of an image. In the generated heat map, each pixel is associated with a respective probability for the pixel to be associated with an object belonging to the given class and present in the image, i.e. the probability that the pixel belongs to an object of the given class represented in the image.

It should be understood that the method 10 may be executed by at least one electronic device provided with at least a processor or processing unit, a memory and communication means.

A set of training images is used to train the machine learning localization model. Each training image contains the representation of at least one object belonging to the given class of objects associated with the machine learning localization model. The number of objects of the given class represented in each training image, i.e. the ground truth number, is associated with each training image.

It should be understood that the database from which the set of training images is selected is chosen as a function of the class of objects to be counted and localized by the machine learning model.

At step 12, an input training image corresponding to one of the training images is received along with its associated number of objects belonging to the given class represented or contained therein. It should be understood that the training image may comprise objects of different classes but the number of objects associated with the training image corresponds to the number of objects represented in the training image that belongs to a single class of objects, i.e. the class of objects associated with the machine learning localization model. For example, buildings, human beings and cars may be represented in the initial image. If cars represents the class of objects associated with the machine learning localization model, i.e. the machine learning localization model is configured for localizing cars, then the number of objects associated with the training image corresponds tot eh number of cars contained in the training image.

The training image is inputted into the machine learning localization model to generate a heat map corresponding to the training image and the generated heat map is received at step 14. The heat map is indicative of the presence and localization of objects of the given class within the training image and the number of objects belonging to the given class contained within the image can be inferred from the heat map, as known in the art. As mentioned above, each pixel of the heat map has a probability that the pixel belongs to an object of the given class associated thereto.

In one embodiment, the value of the probability that a pixel belongs to an object of the given class varies between zero and one. In this case, when the probability assigned to a given pixel is zero, the given pixel clearly does not belong to an object of the given class and may belong to a background represented in the image or to an object of another class for example. If the probability assigned to a given pixel is one, the given pixel clearly belongs to an object of the given class.

At step 16, regions that may correspond to potential objects of any class of objects are identified within the training image using a region proposal model such as a region proposal model. The identified regions are referred to as proposals hereinafter. Each proposal may have any adequate shape such as a box shape. In one embodiment, several dozens of proposals are identified within the input image at step 16. In another embodiment, several hundreds of proposals are identified within the input image at step 16. In a further embodiment, the number of proposals identified at step 16 is equal to at least one thousand.

It should be understood that the region proposal model does not discriminate between objects of different classes and identifies all objects contained within the training image independently of the class to which objects belong. For example, if a training image comprises cars, buildings and human beings, the region proposal model localize all cars, buildings and human beings contained in the training image without making any distinction between them.

The region proposal model further assigns an initial probability (hereinafter referred to as the initial proposal probability) to each proposal. The probability assigned to a proposal is also known as the objectness. The initial proposal probability associated with each proposal corresponds to the probability for the proposal to identify or correspond to an object independently of the class of the object. As a result, each proposal is defined by a respective position within the input image and a respective initial probability. It should be understood that the proposals may have a different shape and/or size. In another example, the proposals all have the same shape and size. In a further example, all proposals may have the same shape such as the shape of a bounding box while the size of the proposals may vary from one proposal to another. It should also be understood that some proposals may overlap at least partially.

It should be understood that any adequate region proposal model adapted to identify objects of different classes may be used. For example, the region proposal model may be a region proposal network, a selective search model, a sharpmask, a deepmask or the like.

At step 18, for each proposal identified at step 16, the value of the corresponding initial proposal probability is corrected using the heat map generated at step 14, as described in greater detail below. As a result, each proposal identified at step 16 is assigned a respective corrected proposal probability of identifying an object of the given class within the input image.

For each proposal, the respective initial probability is corrected using the probability of the pixels of the heat map which are located within the region of the training image defined by the proposal, i.e. the probability assigned to the pixels of the heat map located within a region located at the same position as the proposal within the training image and having the same shape and size as those of the proposal.

It should be understood that different methods may be used for correcting the initial probability and obtaining a corrected probability for the proposals.

In one embodiment, the corrected probability assigned to a proposal corresponds to the maximum value between the value of the initial probability of the proposal and the maximum probability value of the heat map pixels corresponding to the proposal.

In another embodiment, the corrected probability assigned to a proposal corresponds to the maximum value between the value of the initial probability of the proposal and the mean of the probabilities of the heat map pixels corresponding to the proposal.

In a further embodiment, the corrected probability assigned to a proposal corresponds to the mean of the value of the initial probability of the proposal and the maximum probability value of the heat map pixels corresponding to the proposal.

In still another embodiment the corrected probability assigned to a proposal corresponds to the mean of the value of the initial probability of the proposal and the mean of the probabilities of the heat map pixels corresponding to the proposal.

The output of step 18 comprises the proposals identified at step 16 for which the initial probability has been replaced by the corrected probability calculated at step 18.

At step 20, object candidates are selected amongst the proposals having the corrected probability assigned thereto and the position of the object candidates is outputted. The selected object candidates corresponds to the proposals having the greatest corrected probability and the number of selected proposals is at most equal to the ground truth number associated with the training image.

In one embodiment, the number of selected object candidates is equal to the ground truth number associated with the training image.

In another embodiment, the number of selected object candidates may be less than the ground truth number and gradually increased while steps 12-24 are repeated in cycles, as described below.

In one embodiment, the output of step 20 comprises the position of the object candidates, i.e. for each selected proposal, the position within the training image of a given reference point associated with the selected proposal such as the position of the center point of each selected proposal. In this case, step 20 further comprises identifying a reference point for each selected proposal (such as the center of each selected proposal) and outputting the position within the image of each reference point. The reference points correspond to pseudo point-level annotations or pseudo ground truth annotations that will be used to train the machine learning localization model.

In another embodiment, the output of step 20 comprises the selected proposals without their corrected probability. In this case, the above described reference points corresponding to the selected proposals may also be outputted along with the selected proposals.

In a further embodiment, three regions are identified within the training image at step 20, i.e. a background region, a foreground region and an unlabeled region. The background region corresponds the region of the training image which intersects with no proposal. The foreground region corresponds to the region of the training image that intersects with the selected proposals, i.e. the proposals having the greatest corrected probability. The remaining region of the training image corresponds to the unlabeled region. In this case, the foreground region, the background image and/or the unlabeled region. In addition, the above described reference points corresponding to the selected proposals may also be outputted along with the foreground region, the background image and/or the unlabeled region.

In one embodiment, the foreground region and the reference points reference points corresponding to the selected proposals are outputted at step 20.

In another embodiment, the foreground region, the background region and the reference points reference points corresponding to the selected proposals are outputted at step 20 so that only the unlabeled region is ignored.

At step 22, a loss value is calculated using the loss function associated with the machine learning localization model, the heat map received at step 14 and the output of step 20, i.e. at least the position of the object candidates which represent pseudo point-level annotations and optionally the selected proposals, the foreground region, the background region and/or the unlabeled region.

In an embodiment in which the machine learning localization model is an FCN network model, the loss function may be expressed as:

$$\mathcal{L}_L = \underbrace{\mathcal{L}_I(S, T)}_{\text{Image-level loss}} + \underbrace{\mathcal{L}_P(S, T)}_{\text{Point-level loss}} + \underbrace{\mathcal{L}_S(S, T)}_{\text{Split-level loss}} + \underbrace{\mathcal{L}_F(S, T)}_{\text{False positive loss}} ,$$

where T represents the point annotation ground-truth, and S is FCN's output mask. $\mathcal{L}_L$ consists of four terms: an image-level loss ($\mathcal{L}_I$) that trains the model to predict whether there is an object in the image; a point-level loss ($\mathcal{L}_P$) that encourages the model to predict a pixel for each object instance; a split-level ($\mathcal{L}_S$) and a false-positive ($\mathcal{L}_F$) loss that enforces the model to predict a single blob per. Furthermore, the unlabeled region ignored and the probability of a background proposal is set to zero.

At step 24, the calculated loss is provided to the machine learning localization model that updates its parameters accordingly, thereby training the machine learning localization model.

It should be understood that the steps 12-22 are repeated iteratively for each training image contained in the set of training images.

In one embodiment, the execution of steps 12-22 for the whole set of training images represents one training cycle and the training of the machine learning localization model comprises a plurality of training cycles. The number of object candidates to be identified at step 20 increases from one cycle to another until being equal to the ground truth number at the last training cycle.

For example if each image contained in the set of training images contained three objects of the class of objects to be localized, the number of object candidates to be identified at step 20 is set at one for the first training cycle. Steps 12-22 are executed for each training image. Then the number of object candidates to be identified at step 20 is set at two for the second training cycle and steps 12-22 are executed for each training image. Finally, the number of object candidates to be identified at step 20 is set at three for the third training cycle and steps 12-22 are executed for each training image.

Once trained, the machine learning localization model adapted to localize objects of a given call of objects may generate, for any input image, a corresponding heat map indicative of the position of objects of the given class within the image and the number of objects of the given class represented in the input image may be inferred from the heat map. For example, the heat map may be used for generating blobs that each represent an object. The blobs may be generated by thresholding the probability associated with each pixel of the heat map. For example, the probability assigned to each pixel of the heat map may be compared to a threshold value and the pixel is assigned a new probability value that depends on the comparison result. For example, the threshold may be set at 0.5. In this case, all pixels of the heat map of which the probability value is below to 0.5 are assigned a new probability value equal to zero, i.e. these pixels are considered as not belonging to an object. The remaining pixels, i.e. all pixels of the heat map having a probability equal to or superior to 0.5, are assigned a new probability value of one, i.e. these pixels are considered as belonging to an object.

The pixels for which the probability value has been changed to one form blobs from which the position and number of objects contained in the image may be determined. Each distinct blob, i.e. each blob that does not intersect with another blob, corresponds to an object and the number of objects contained in the image is obtained by counting the number of distinct blobs. The position of the objects contained in the image may also be determined from the position of the blobs within the image.

Figure 2:
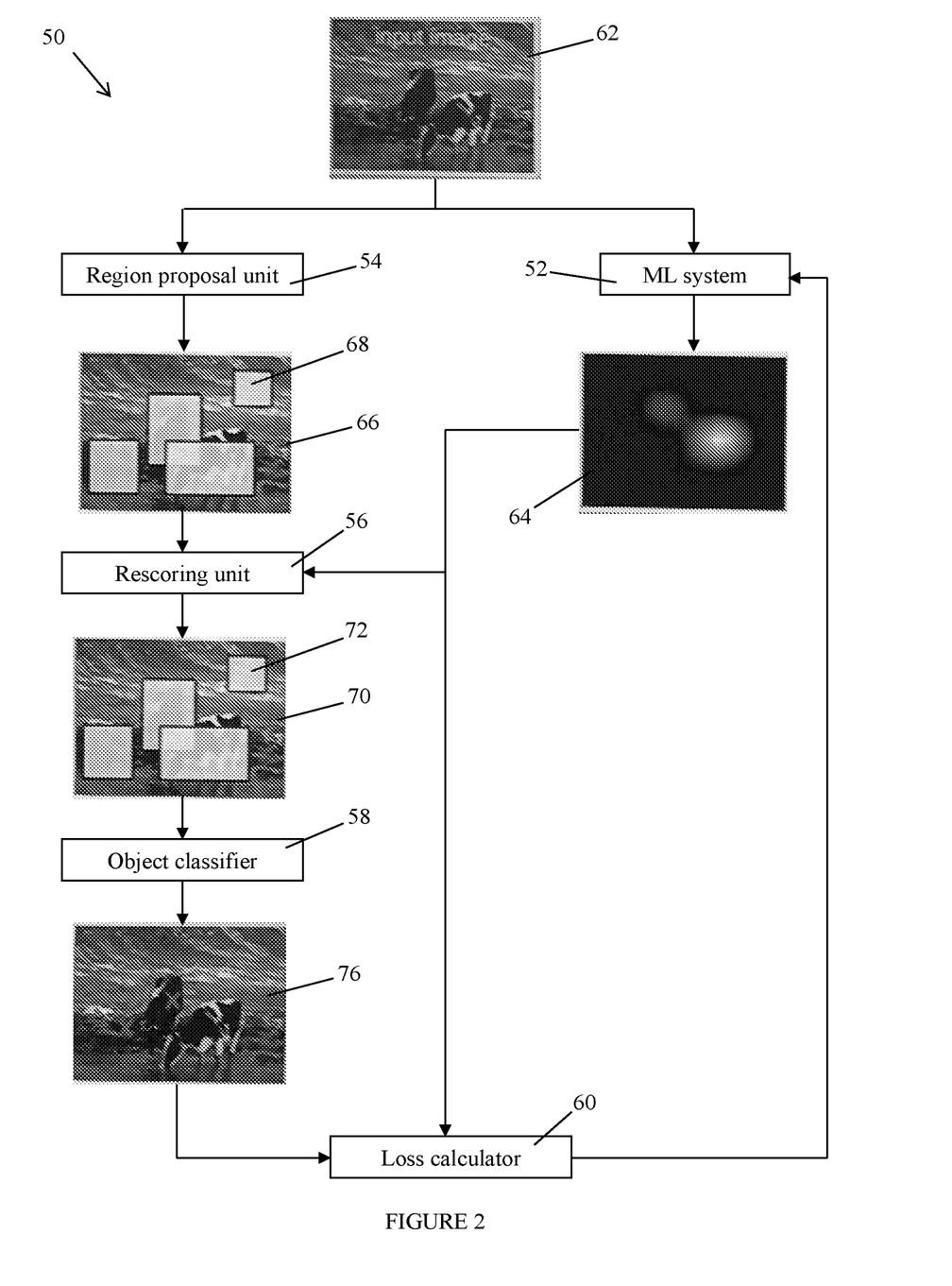
FIG. 2 is a block diagram illustrating a system for training a machine learning localization model to localize objects of interest within an image, in accordance with an embodiment.

FIG. 2 illustrates on embodiment of a system 50 for training a machine learning localization system 52 to localize objects of a given class within an image by generating a heat map of the image. The system 50 comprises a region proposal unit 54, a rescoring unit 56, an object classifier 58 and a loss calculator 60.

A training image 62 is inputted in the machine learning localization system 52 which outputs the is to be trained to localize objects of a given class within an image by generating a heat map 64 of the image 62. The training image 62 is taken from a set of training images each representing at least one object of the given class of objects on which the machine learning localization system 52 is to be trained, and the number of objects of the given class represented in the training image 62 is associated the training image 62, as described above.

In one embodiment, the machine learning localization system 52 is a fully supervised localization system. For example, the machine learning localization system 52 may be a FCN network, a FCN with a ResNet backbone, a PSPNet, DeepLab, a Tiramisu or the like.

The region proposal unit 54 is configured for receiving the training image 62 and generating proposals as described above with respect to step 16, i.e. identifying potential objects within the training image 62 independently of the class of the objects. For example, the output of the region proposal network 54 may be an image 66 which corresponds to the training image 62 in which bounding boxes 68 are added. Each bounding box 68 represents a proposal, i.e. a potential object within the image 66. The region proposal unit 54 is further configured for determining and assigning an initial probability to each determined proposal, i.e. an initial probability is assigned to each bounding box 68. The initial probability indicates the probability that a proposal contains an object independently of the class of the object.

It should be understood that any adequate region proposal unit adapted to localize potential objects within an image may be used. For example, the region proposal unit 54 may be an RPN, a selective search unit, a sharpmask, a deepmask or the like.

Once generated, the image 66 is then transmitted to the rescoring unit 56. Alternatively only the proposals 68 are transmitted to the rescoring unit 56

The rescoring unit 56 is configured for receiving the image 66 from the region proposal network 54 and the heat map 64 generated by the machine learning localization system 52. The rescoring unit 56 is configured for modifying or correcting the initial proposal probability assigned to each proposal 68 using the heat map 64, as described above with respect to step 18. As a result, a corrected probability is calculated and assigned to proposal 68. The rescoring unit 56 may then output an image 70 containing proposals/bounding boxes 72 that each identify a potential object within the image 70 and to which a respective corrected probability is assigned. It should be understood that the image 70 corresponds to the image 66 and the proposals 72 correspond to the proposals 68, the only difference being the value of the proposal probability being assigned to the proposals 72 relative to the proposals 68. The rescoring unit 56 then transmits the image 70 to the object classifier 58. Alternatively, only the proposals 72 may be transmitted to the object classifier 58.

The object classifier 58 is configured for receiving the image 70 comprising the proposals 72 identifying the position of potential objects and the number of potential objects. The object classifier 58 is configured for selecting object candidates amongst the proposals 72 and outputting the position of the selected proposals. The object classifier 58 selects the proposals 72 having the greatest corrected probability and the number of selected proposals is at most equal to the ground truth number associated with the training image 62.

In one embodiment, the number of selected object candidates is equal to the ground truth number associated with the training image 62.

In another embodiment, the number of selected object candidates may be less than the ground truth number and gradually increased at each training cycle, as described above.

In one embodiment, the object classifier 58 determines one reference point for each selected proposal (such as the center of each selected proposal) and outputs the position of the reference points. The object classifier 58 may further output the selected proposals without their associated probability.

In one embodiment, the object classifier 58 is also configured for identifying three regions within the training image 62, i.e. a foreground region, a background region and an unlabeled region, as described above with respect to step 20. The object classifier 58 may then output the position of the reference points and the foreground region and/or a background region.

The loss calculator 60 is configured for receiving the position within the training image 62 of the selected proposals from the object classifier 58 and the heat map 64 from the machine learning localization system 52. The loss calculator 60 is further configured for calculating a loss value using the loss function associated with the machine learning localization system 52, the heat map and the output of the object classifier 58, i.e. at least the position of the object candidates which represent pseudo point-level annotations and optionally the selected proposals, the foreground region, the background region and/or the unlabeled region.

The calculated loss value is then transmitted to the machine learning localization system which automatically adjusts its internal parameters accordingly.

In one embodiment, the loss calculator 60 is integral with the machine learning localization system 52.

All of the training images of the set of training images are iteratively inputted into the system 50 to train the machine learning localization system 52.

As described above, a plurality of training cycles may be performed to train the machine learning localization system 52. In this case, the number of object candidates to be identified by the object classifier 58 is increased from one cycle to another until it be equal to the ground truth number.

Once trained, the machine learning localization system 52 is capable of localizing objects of a given class within an image by generating a heat map. The heat map is indicative of the number and position of the objects of the given class represented in the training image, as explained above.

Figure 3:
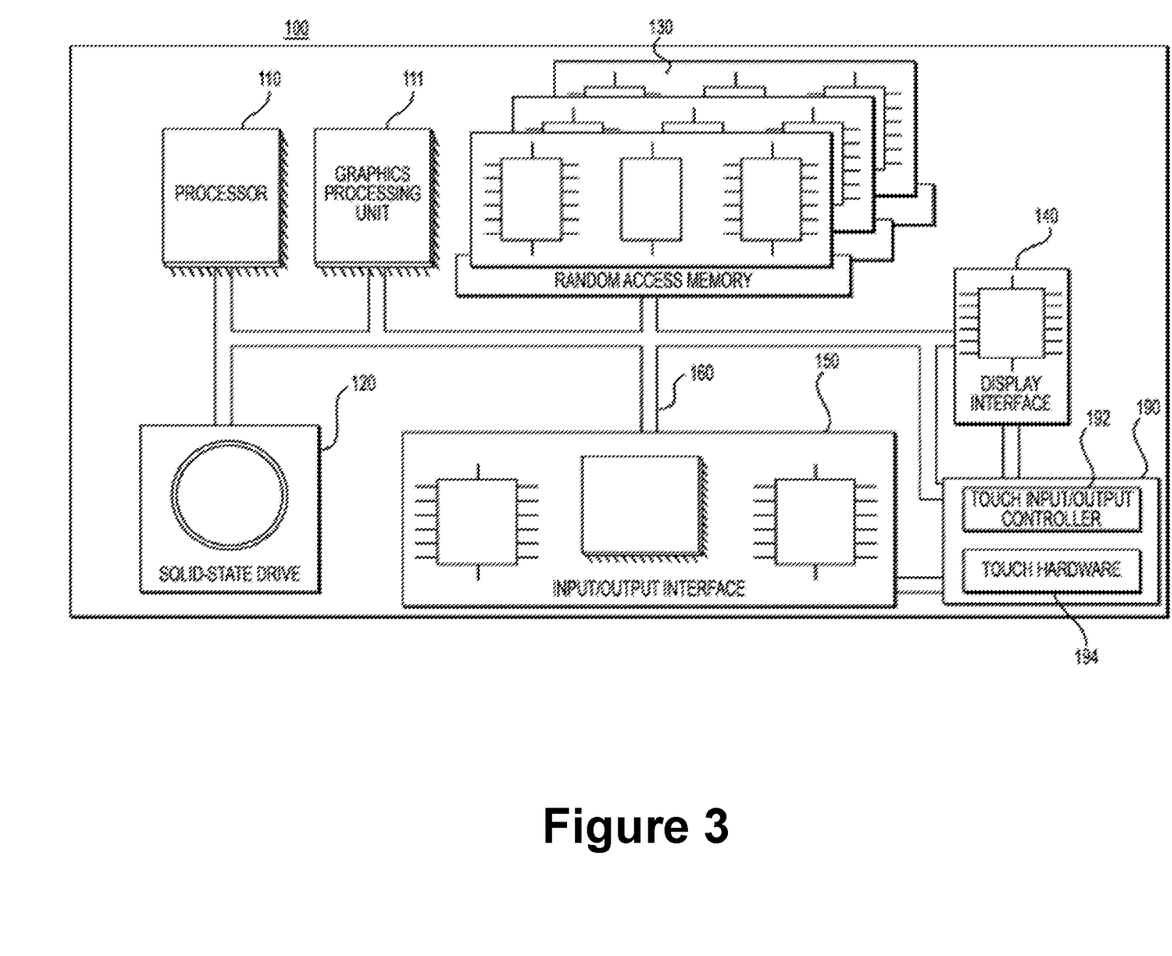
FIG. 3 is a schematic diagram of an electronic device in accordance with non-limiting embodiments of the present technology.

Referring to FIG. 3, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

Figure 4:
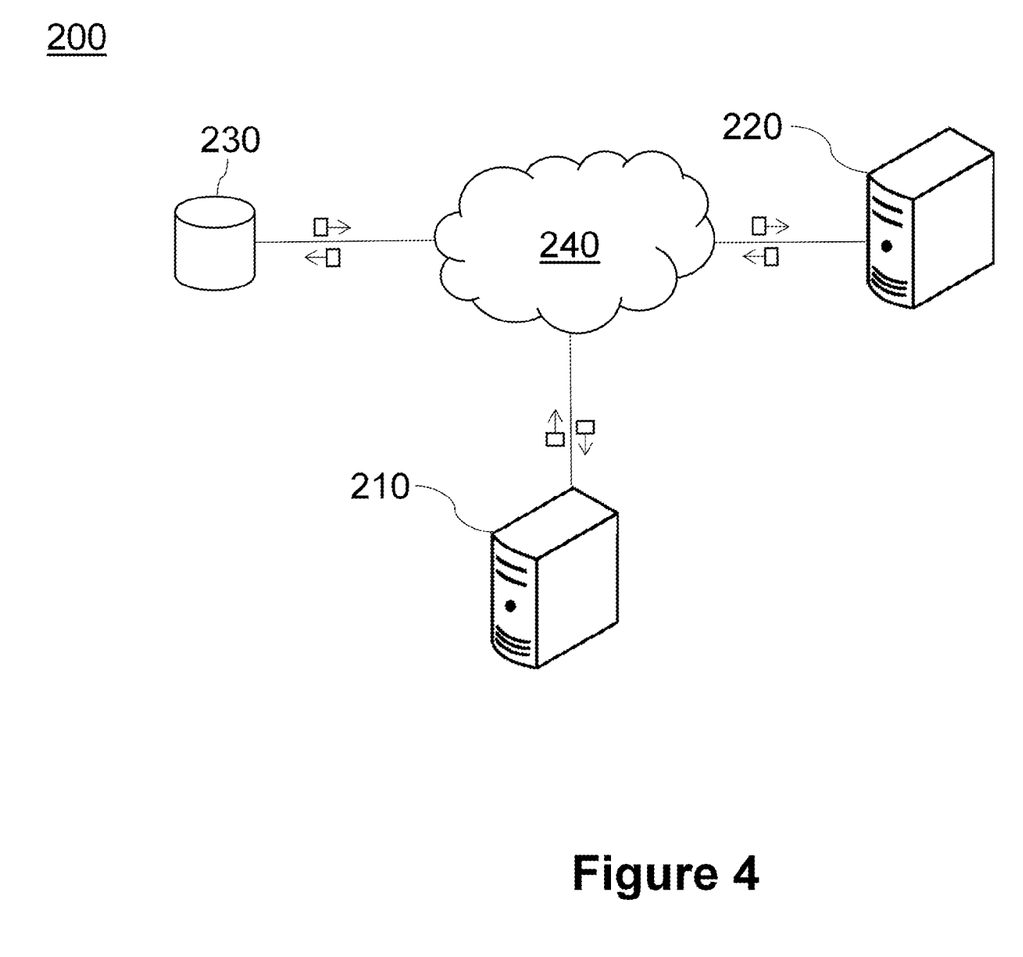
FIG. 4 depicts a schematic diagram of a system in accordance with non-limiting embodiments of the present technology.

Referring to FIG. 4, there is shown a schematic diagram of a system 200, the system 200 being suitable for implementing non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a first server 210, a second server 220 and a database 230 communicatively coupled over a communications network 240.

Generally speaking, the first server 210 is configured for executing a machine learning localization model and generating heat maps of input images and adjusting its internal parameters according to a calculated loss. In one embodiment, the first server 210 may further be configured for calculating the loss, as described above.

The first server 210 can be implemented as a conventional computer server and may comprise at least some of the features of the electronic device 100 shown in FIG. 3. Needless to say, the first server 210 can be implemented in any suitable hardware and/or software and/or firmware or a combination thereof. In the shown non-limiting embodiment of present technology, the first server 210 is a single server. In alternative non-limiting embodiments of the present technology, the functionality of the first server 210 may be distributed and may be implemented via multiple servers (not shown).

The implementation of the first server 210 is well known to the person skilled in the art of the present technology. However, briefly speaking, the first server 210 comprises a communication interface (not shown) structured and configured to communicate with various entities (such as the knowledge source 230, for example and other devices potentially coupled to the network) via the network 240. The first server 210 further comprises at least one computer processor (e.g., the processor 110 of the electronic device 100) operationally connected with the communication interface and structured and configured to execute various processes to be described herein.

Referring back to FIG. 4, at least one database 230 having stored therein training images is communicatively coupled to the first and second servers 210 and 220 via the communications network 240. Although the database 230 is illustrated schematically herein as a single entity, it is contemplated that the database 230 may be configured in a distributed manner, for example, the database 230 could have different components, each component being configured for a particular kind of retrieval therefrom or storage therein.

The data source 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the first server 220. Generally speaking, the database 230 may receive data from the first server 220 for storage thereof and may provide stored data to the first server 220 for use thereof.

Referring back to FIG. 4, the system 200 also comprises the second server 220.

Generally speaking, the second server 220 is configured for:
- identifying proposals and assigning a respective initial probability to each proposal;
- correcting the value of the initial probability of each proposal using the heat map generated by the first server 210 to assign a corrected probability to each proposal; and
- identifying object candidates based on the corrected probability of the identified regions.

In one embodiment, the second server 220 is further configured for calculating the loss using the heat map and the position of the object candidates.

In one embodiment, the identification of the proposals is not performed by the second sever 220 and the system 200 further comprises a third server configured for identifying the proposals.

Similarly to the first server 210, the second server 220 can be implemented as a conventional computer server and may comprise some or all of the features of the electronic device 100 shown in FIG. 3. The second server 220 can be implemented in any suitable hardware and/or software and/or firmware or a combination thereof. In the shown non-limiting embodiment of present technology, the second server 220 is a single server. In alternative non-limiting embodiments of the present technology, the functionality of the second server 240 may be distributed and may be implemented via multiple servers (not shown).

The implementation of the second server 220 is well known to the person skilled in the art of the present technology. However, briefly speaking, the second server 220 comprises a communication interface (not shown) structured and configured to communicate with various entities (such as the first server 210 and the data source 230, for example and other devices potentially coupled to the network) via the network. The second server 220 further comprises at least one computer processor (e.g., the processor 110 of the electronic device 100) operationally connected with the communication interface and structured and configured to execute various processes to be described herein.

In some non-limiting embodiments of the present technology, the first server 210 and the second server 220 may be implemented as a single server. In other non-limiting embodiments, functionality of the first server 210 and/or the second server 220 may distributed among a plurality of electronics devices.

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations for the communication network 240 are for illustration purposes only. How a communication link (not separately numbered) between the first server 210, the database 230, the second server 220 and/or another electronic device (not shown) and the communications network 240 is implemented will depend inter alia on how each electronic device is implemented.

In the following, there is described an exemplary embodiment of the present technology.

1. INTRODUCTION

In the task of object localization, a model has to predict the location of each object in the image. This task is important for applications such as public safety, crowd monitoring, and traffic management. Typically, point-level annotations are provided for training the model. A more challenging problem is when only count-level annotations are provided, which are cheaper to acquire than point-level annotations. Count-level annotations make the localization task significantly more difficult for the model. In dense scenes, the model has to identify which objects in the image correspond to the count. These objects can heavily overlap, and can vary widely in scale, shape, and so on. Current methods partially address this problem setup but only for datasets where objects are salient and rarely overlap. These methods do not work for dense scene datasets since they do not contain background images that are required by these methods. The present method and system enable learning to localize objects for dense scenes.

Acquiring object count labels in images requires much less human effort than annotating the location of each object. For training images with 4 or less objects, the annotator can obtain the object count much faster than with point annotations through subitizing. For videos, the annotator can obtain the object count quickly across image frames as the count changes much less frequently than the object locations in the video. In some cases, object counts can be obtained with no effort compared to point-level annotations. These cases include keeping count of products on retail stock shelves, and keeping count of a crowd of people at events where the ticket system registers their actual count. In both cases, identifying object locations is important for safety and logistics.

Many methods exist that can perform object localization but they need to be trained on point-level annotations or image-level. They fall under two main categories: density-based and segmentation-based localization. Density-based methods transform the point-level annotations into a density map using a Gaussian kernel. Then, they train using a least-squares objective to predict the density map. However, these methods do not provide individual locations of the objects. On the other hand, segmentation-based methods such as LC-FCN train using a loss function that encourages the output to contain a single blob per object. For the framework, the individual object locations obtained by LC-FCN are used to help in generating the pseudo point-level annotations.

A prior art method includes ImageNet pre-trained model such as ResNet50 with a regression layer as its output layer. Unfortunately, this prior art method is not designed to localize the objects of interest in the image. The present method and system correspond to a novel approach that uses count supervision to localize objects in dense scenes.

Most weakly supervised localization methods fall under multiple-instance learning (MIL). In the present technology, each image corresponds to a bag of object proposals. Each bag is labeled based on whether an object class exists. In the prior art, a two-step approach was proposed. First, a mask-out strategy is used to filter the noisy object proposals; then, a Faster RCNN is used for detection using bags of instances. Another prior art method uses a refinement learning strategy to improve on the quality of the proposals. C-MIL introduces a continuation optimization method to avoid getting stuck in a local minima. C-WSL uses count information to obtain the highest scoring proposals. However, it relies on a classification network that is not designed for dense scenes.

In one embodiment, the present method is referred to as a method to Localize Overlapping Objects with Count supervision (LOOC). It trains by alternating between two stages. In the first stage, LOOC learns to generate pseudo point-level annotations in a semi-supervised learning manner. In the second stage, LOOC uses a fully-supervised localization method that trains on these pseudo labels.

Figure 5A:
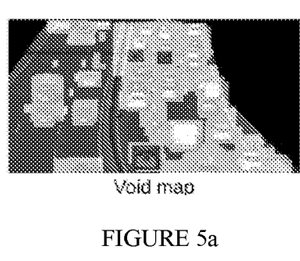
FIG. 5a illustrates an exemplary void map corresponding to an image in which highest scoring proposals appear as initial labels and lower scoring proposals appear as unlabeled.
Figure 5B:
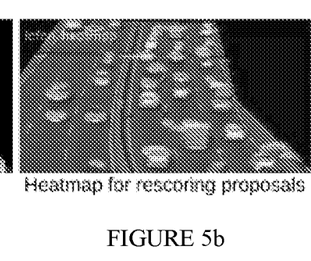
Figure 5C:
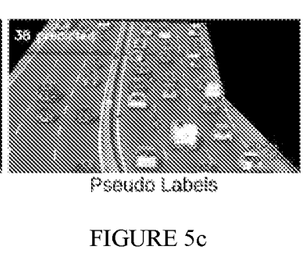
FIG. 5c illustrates the image of FIG. 5a in which proposals have been rescored, in accordance with an embodiment.

As illustrated in FIGS. 5a-5c, the pseudo labels are the centroids of the highest scoring proposals generated using a standard proposal method such as selective search. This set of scores is the combination of the proposal objectness and the probability heat-map obtained from the trained localization method. The proposals that have low scores are considered unlabeled. The localization method uses the pseudo labels and ignores the regions that are unlabeled. The goal for the localization method is to infer the object probabilities in these unlabeled regions. These probabilities are used to re-score the proposals to generate the pseudo labels in the next round 2. At test time, only the localization method is kept, which can be directly used to predict the locations and count of the objects of interest.

LOOC is compared below to the prior art Glance method and a fully supervised LCFCN. LOOC is benchmarked against various counting datasets such as Trancos, Penguins, UCSD and Mall. As described below, LOOC achieves a strong new baseline in the novel problem setup where only count supervision is available with respect to localization. Further, LOOC outperforms current state-of-the-art methods that only use count as their supervision.

2. PROPOSED METHOD: LOOC

2.1. Proposal Network

One of the main challenges of training with only count supervision is to identify which objects of interest (i.e. objects belonging to a given class of objects) in the image correspond to the object count. Object proposals could be used to identify which regions are likely to have the objects of interest. However, proposal methods are class-agnostic as they do not provide the class label. Thus, they might propose the wrong objects.

To alleviate this drawback and in one embodiment, LOOC proposes a semi-supervised learning methodology where only the centroids of the proposals with the highest saliency score are considered as pseudo point-level annotations. The rest of the proposals represent unlabeled regions. When it is trained on these salient proposals, a localization model can be used to predict a class probability map (CPM) for the objects of interest that are in the unlabeled regions. These probabilities are used as positive feedback to rescore the proposals and obtain better pseudo point-level annotations for the next round.

2.2. Framework

Figure 6:
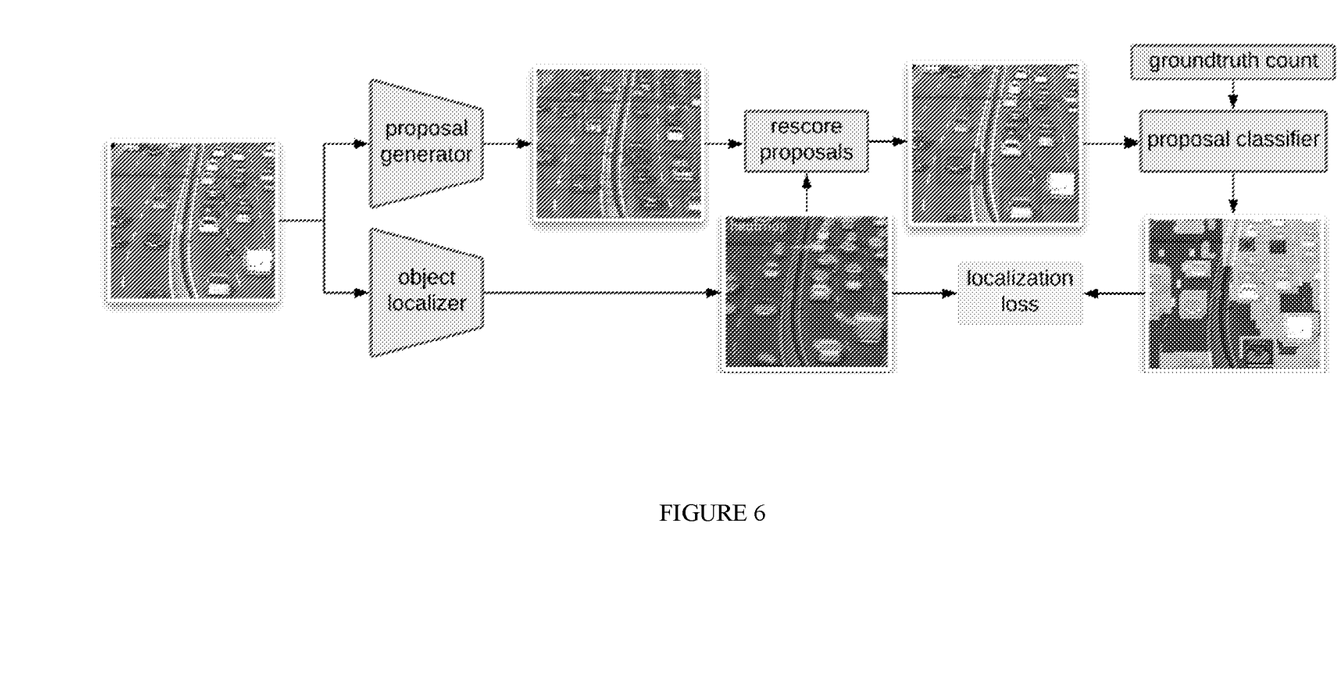
FIG. 6 is a block diagram illustrating a system for training an object localizer, the system comprising a pseudo label generation branch that obtains point-level labels by selecting the highest scoring object proposals, and a localization branch that trains a fully supervised localization model on the pseudo labels, in accordance with an embodiment.

FIG. 6 illustrates the pipeline of the framework LOOC. It consists of three components: a proposal generator, a proposal classifier, and an object localizer. The proposal generator and classifier are used to obtain the pseudo point-level annotations, whereas the object localizer is trained on these annotations to count and localize objects. Each of these components is explained below.

2.3. Generating Pseudo-Labels

In this section, the proposal generator and the classifier are described and it is also described how they can be used to generate pseudo point-level annotations.

First, a proposal generator such as selective search is used to output 1000 proposals that correspond to different objects in the image. Each of these proposals has an associated score obtained from the object localizer (described in greater detail below). The proposal classifier uses these scores to obtain labeled and unlabeled regions in the training images.

The regions that do not intersect with any proposal are labeled as background whereas the region that intersect with the r highest-scoring proposals are labeled as foreground. The remaining regions are considered unlabeled.

The highest scoring proposals are selected using non-maximum suppression, and their centroids are considered as the pseudo point-level annotations used to train the object localizer.

2.4. Training a Localization Method

Using the pseudo point-level labels, any fully supervised localization network such as LC-FCN and CSR-Net can be trained. In the present embodiment, LC-FCN is chosen due to its ability to get a location for each object instance rather than a density map. For the point annotations in the labeled regions, LC-FCN is trained using its original loss function described in detail in the following scientific publication: I. H. Laradji, N. Rostamzadeh, P. O. Pinheiro, D. Vazquez, and M. Schmidt. Where are the blobs: Counting by localization with point supervision. In ECCV, 2018.

LC-FCN's predictions on the unlabeled regions are ignored during training. However, the class probability map (CPM) that LC-FCN outputs for those regions is used to rescore the proposals in order to obtain a new set of pseudo point-level annotations.

2.5 Overall Pipeline

LOOC is trained in cycles where in each cycle it alternates between generating pseudo point-level annotations and training LC-FCN on those labels (see Algorithm 1 below). Let $c_i$ be the true object count for image i. At a given cycle, only the top $r_i$ scoring proposals (where $r_i \leq c_i$) are considered to be used for obtaining the pseudo point-level annotations. After training LC-FCN with the top $r_i$ proposals, w its class probability map (CPM) is used to rescore the proposals and increase $r_i$ by δ. The score of each proposal is the mean of CPM's region that intersects with that proposal. This allows to pick a larger number of pseudo point-level annotations and increase the size of the labeled regions. The procedure ends when $r_i$ equals $c_i$ for all images.

| Algorithm 1 LOOC training |
|---|
| 1:    r := 0.1 |
| 2:    while r <= 1 do |
| 3:       Obtain LC-FCN's class probability map (CPM) |
| 4:       Generate proposals P |
| 5:       Compute scores $S_P$ using CPM |
| 6:       Select top r · c proposals (c is the object count) |
| 7:       Obtain labeled and unlabeled regions for all images |
| 8:       Train LC-FCN on the labeled regions |
| 9:       r = r + δ (increase ratio of selected proposals) |
| 10:    end while |
| 11:    Generate the final pseudo point-level annotations |
| 12:    Train LC-FCN on these labels |

3. EXPERIMENTS

In this section, LOOC is evaluated LOOC on four dense scene datasets: UCSD, Trancos, Mall and Penguins. For each of these datasets, only the count labels are used instead of the original point-level annotations. For evaluation, the mean-absolute error (MAE) is used for measuring counting performance, and grid average mean absolute error (GAME) is used for localization performance.

For localization, LOOC is compared against a proposed baseline called TopK. The difference between TopK and LOOC is that TopK uses the fixed scores provided by the proposal generator to score the proposals and LOOC uses the dynamic scores provided by the object localizer's class probability map (CPM).

LOOC is also compared against Glance, a state-of-the-art counting method that also uses count supervision. While Glance does not localize objects, the purpose of this benchmark is to observe whether the location awareness provided by LOOC can help in counting. LOOC uses the ResNet-50 backbone for feature extraction, and they are optimized using ADAM with a learning rate of $1 e^{-5}$ and a weight decay of 0.0005. Similar results were also obtained using optimizers that do not require defining a learning rate.

UCSD consists of images collected from a video camera at a pedestrian walkway. This dataset is challenging due to the frequent occurrence of overlapping pedestrians, which makes counting and localization difficult. The frames were resized to 952×632 pixels using bilinear interpolation to make them suitable for the ResNet based models. The frames 601-1400 are used as training set and the rest as test set, which is a common practice.

Figure 7:
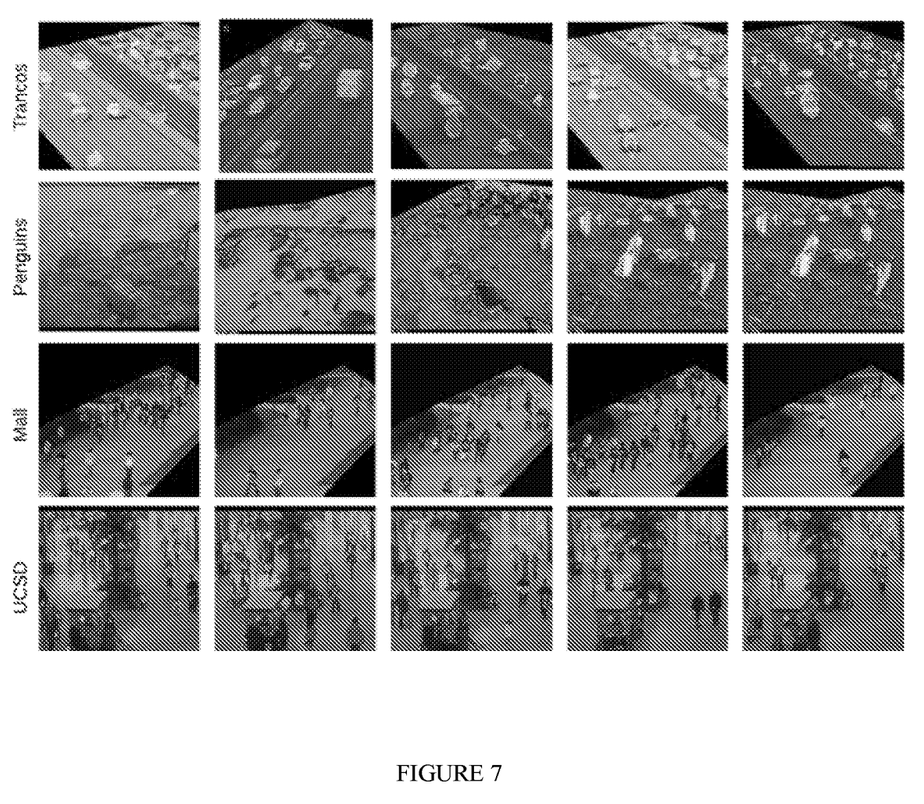
FIG. 7 illustrates exemplary experimental results showing predictions obtained using the method of FIG. 1 on the 4 dense scene datasets.

Table 1 shows that LOOC outperforms Glance in terms of MAE, suggesting that localization awareness helps in counting as well. Further, LOOC outperforms TopK with respect to MAE and GAME suggesting that LCFCN provides informative class probability map. LOOC's results are also close to the fully supervised LCFCN, which indicates that good performance can be achieved with less costly labels. Qualitatively, LOOC is able to accurately identify pedestrians for UCSD (as illustrated in FIG. 7).

TABLE 1

Count and localization results across dense scene validation set

| | USCD | | Trancos | | Mall | | Penguins | |
|---|---|---|---|---|---|---|---|---|
| | MAE | GAME | MAE | GAME | MAE | GAME | MAE | GAME |
| Glance | 3.80 | — | 11.66 | — | 4.67 | — | 14.79 | — |
| LC-FCN | 1.57 | 4.35 | 5.50 | 9.73 | 2.64 | 7.26 | 7.59 | 13.01 |
| TopK | 2.41 | 6.85 | 9.06 | 15.74 | 3.49 | 16.78 | 8.85 | 17.53 |
| LOOC | 2.20 | 6.74 | 8.68 | 14.90 | 3.23 | 16.51 | 8.42 | 15.97 |

Trancos consists of images taken from traffic surveillance cameras for different roads, where the task is to count vehicles, which can highly overlap, making the dataset challenging for localization.

The results shown in Table 1 indicate that LOOC achieves lower MAE than Glance, yet it can perform good localization compared to TopK. Compared to the fully supervised LCFCN, LOOC performs poorly mainly due to the quality of the pseudo point-level annotations, but the qualitative results appear accurate (as illustrated in FIG. 7).

Mall consists of 2000 frames of size 320×240 collected from a fixed camera installed in a shopping mall. These frames have diverse illumination conditions and crowd densities, and the objects vary widely in size and appearance. The results in Table 1 show that LOOC achieves good localization performance compared to TopK and counting performance compared to Glance.

Penguins Dataset consists of images of penguin colonies collected from fixed cameras in Antarctica. The training was performed on 500 images, and the test was performed on 500 unseen images. The quantitative results in Table 1 and qualitative results in FIG. 7 show the effectiveness of LOOC in scenes where objects can come in different shapes and sizes, and can densely overlap.

Ablation studies: the quality of the pseudo point-level annotations provided by LOOC are evaluated in Table 2. After training LOOC, the pseudo labels are generated as the centroids of the top scoring k proposals on the training set and the GAME localization score is measured. One can observe that LOOC outperforms TopK, suggesting that relying on LCFCN's class probability map allows for scoring the proposals better. Thus, given count-level supervision, LOOC can be used to obtain high quality point-level annotations and then effectively train a fully-supervised localization on those point labels.

TABLE 2

Ablations studies. Localization results on the training set to evaluate the quality of the generated pseudo point-level annotations

| | USCD | Trancos | Mall | Penguins |
|---|---|---|---|---|
| TopK | 7.29 | 12.27 | 15.47 | 6.92 |
| LOOC | 6.02 | 10.46 | 14.76 | 5.74 |

4. CONCLUSION

LOOC trains by alternating between generating pseudo point-level annotations and training a fully supervised localization method such as LCFCN. The goal is to progressively improve the localization performance based on pseudo labels. The experiments show that LOOC achieves a strong new baseline in the novel problem setup of localizing objects using only count supervision. They also show that LOOC is a new state-of-the-art for counting in this weakly supervised setup. The experiments also show that the pseudo point-level annotations obtained by LOOC are of high quality and can be used to train any fully supervised localization method.

The embodiments of the invention described above are intended to be exemplary only. The scope of the invention is therefore intended to be limited solely by the scope of the appended claims.

We claim:

1. A computer-implemented method for training a machine learning localization model to localize objects belonging to a given class within an image, the method comprising:
   receiving, at a processor, a plurality of training images each comprising at least one object of the given class; and
   receiving, at the processor, a heat map of a candidate training image in the plurality of training images, the heat map generated using the machine learning localization model, each pixel of the heat map having associated thereto a given probability that the pixel belongs to one of the at least one object;
   identifying, at the processor within the candidate training image, a plurality of proposals each corresponding to a potential object, each proposal having associated thereto an initial probability that the proposal corresponds to the potential object;
   correcting, at the processor, the initial probability using the heat map, thereby obtaining a corrected probability for each one of the plurality of proposals;
   selecting given ones of the plurality of proposals having a greatest corrected probability, thereby identifying object candidates;
   calculating a loss for the machine learning localization model based on a location of the object candidates within the candidate training image and the heat map; and
   providing the calculated loss to the machine learning localization model to update parameters of the machine learning localization model.

2. The computer-implemented method of claim 1, wherein a number of the object candidates is equal to a number of the at least one object of the given class contained in the candidate training image.

3. The computer-implemented method of claim 1, wherein a number of the object candidates is less than a number of the at least one object of the given class contained in the candidate training image.

4. The computer-implemented method of claim 1, further comprising iteratively increasing a number of object candidates and for each iteration performing said receiving the heat map, said identifying the plurality of proposals, said correcting the initial probability, said selecting the given ones of the plurality of proposals, said calculating the loss and said providing the calculated loss.

5. The computer-implemented method of claim 1, wherein said correcting the initial probability is performed using a maximum probability of the given probability of given pixels of the heat map that corresponding to the proposal.

6. The computer-implemented method of claim 5, wherein the corrected probability is a maximum value between the initial probability and the maximum probability.

7. The computer-implemented method of claim 1, wherein said selecting the given ones of the plurality of proposals further comprises identifying a foreground region intersecting the given ones of the plurality of proposals and a background region intersecting none of the plurality of proposals, and said calculating the loss is performed further based on at least one of the foreground region and the background region.

8. The computer-implemented method of claim 1, wherein the machine learning localization model comprises a fully supervised localization model.

9. The computer-implemented method of claim 8, wherein the fully supervised localization model comprises one of a fully convolutional neural (FCN) network, a FCN with a ResNet backbone, a PSPNet, DeepLab and a Tiramisu.

10. The computer-implemented method of claim 1, wherein said identifying the plurality of proposals is performed by one of a region proposal network, a selective search model, a sharpmask and a deepmask.

11. A system for training a machine learning localization system to localize objects belonging to a given class within an image, the system comprising:
   a processor, the processor configured to:
      receive a plurality of training images; and
      identify, within a candidate training image in the plurality of training images, a plurality of proposals, each proposal in the plurality of proposals corresponding to a potential object, each proposal having associated thereto an initial probability that the proposal corresponds to the potential object;
      receive a heat map of the candidate training image from the machine learning localization system, each pixel of the heat map having associated thereto a given probability that the pixel belongs to at least one object of a given class; and
      correct the initial probability using the heat map to obtain a corrected probability for each proposal in the plurality of proposals;
   select, using an object classifier model, given ones of the plurality of proposals having a greatest corrected probability to identify object candidates; and
   calculating a loss for the machine learning localization system based on a location of the object candidates within the candidate training image and the heat map; and
   outputting the calculated loss to update parameters of the machine learning localization system.

12. The system of claim 11, wherein a number of the object candidates is equal to a number of the at least one object of the given class contained in the candidate training image.

13. The system of claim 11, wherein a number of the object candidates is less than a number of the at least one object of the given class contained in the candidate training image.

14. The system of claim 11, wherein the processor is configured to:
   iteratively generate the plurality of proposals for each one of the plurality of training images;
   correct the initial probability at each iteration;
   increase a number of object candidates and selecting given ones of the plurality of proposals at each iteration; and
   calculate the loss at each iteration.

15. The system of claim 11, wherein the processor is configured for correcting the initial probability using a maximum probability of the given probability of given pixels of the heat map that corresponding to the proposal.

16. The system of claim 15, wherein the corrected probability is a maximum value between the initial probability and the maximum probability.

17. The system of claim 11, wherein the processor is further configured for:
   identifying a foreground region intersecting the given ones of the plurality of proposals and a background region intersecting none of the plurality of proposals; and calculate the loss further based on at least one of the foreground region and the background region.

18. The system of claim 11, wherein the machine learning localization system comprises a fully supervised localization system.

19. The system of claim 18, wherein the fully supervised localization system comprises one of a fully convolutional neural (FCN) network, a FCN with a ResNet backbone, a PSPNet, DeepLab and a Tiramisu.

20. The system of claim 11, wherein the processor is further configured to identify the plurality of proposals based on one of a region proposal network, a selective search unit, a sharpmask and a deepmask.

* * * * *